Patented June 7, 1927.

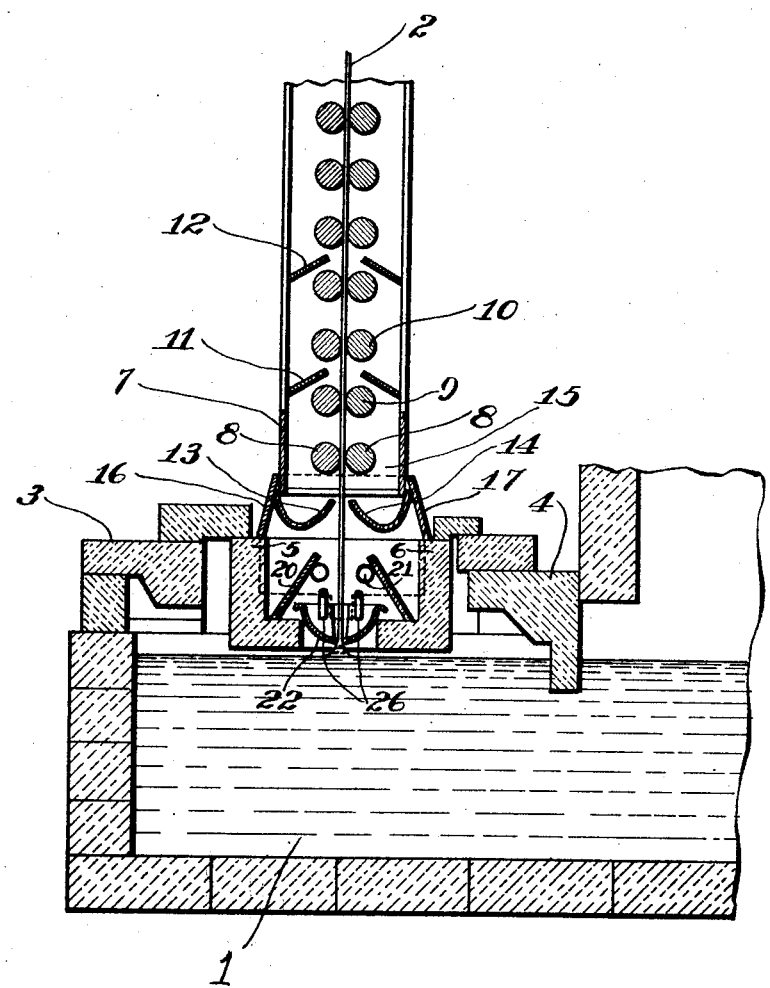

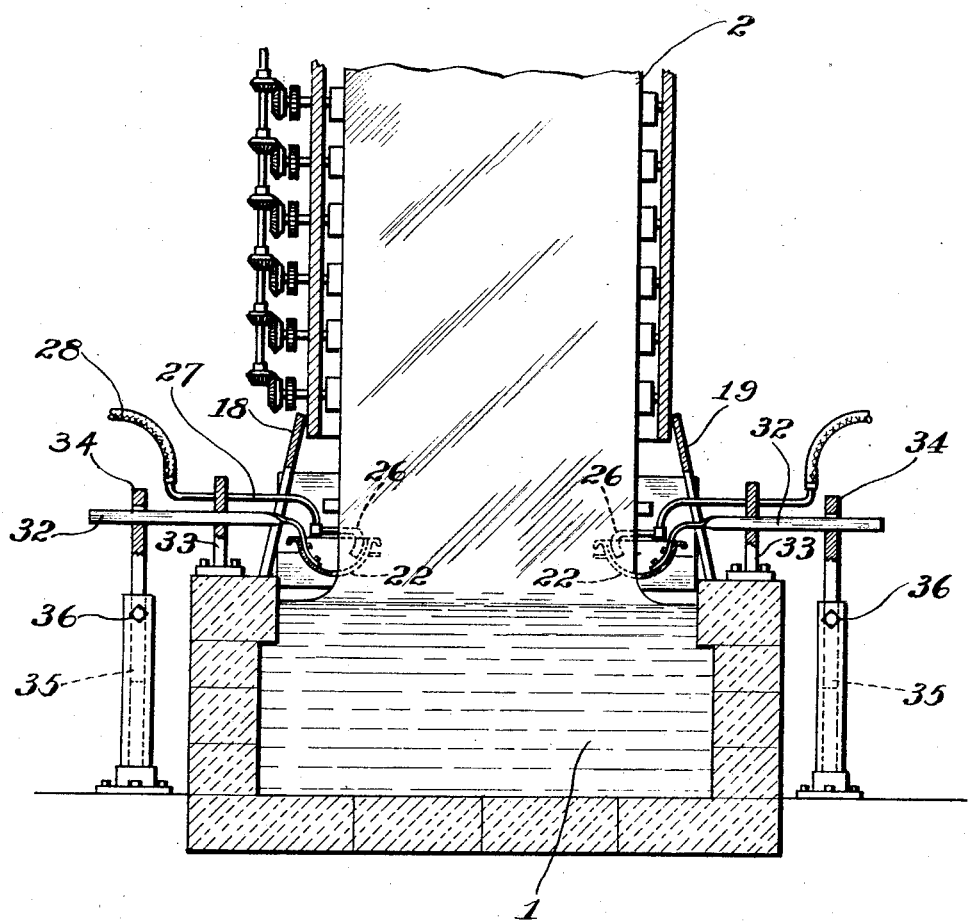

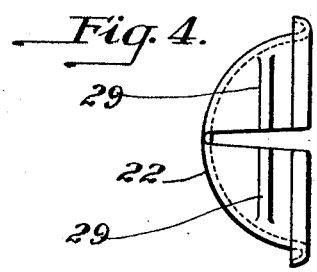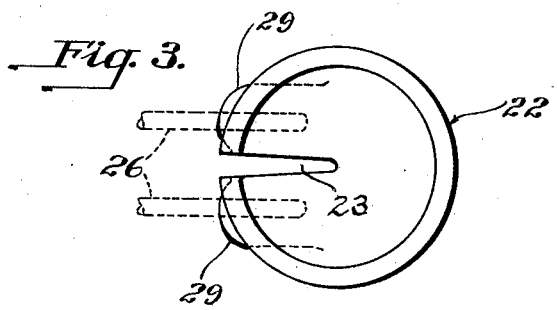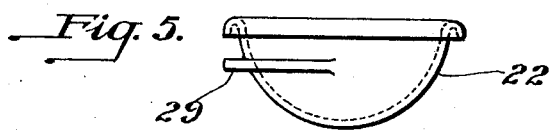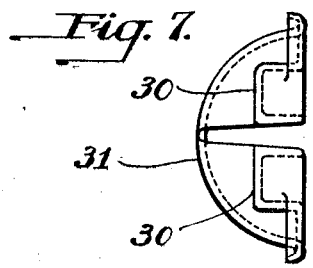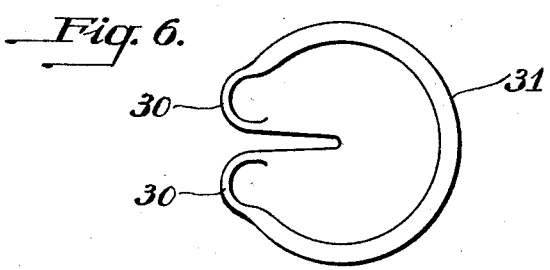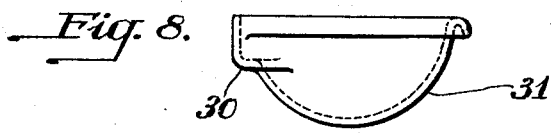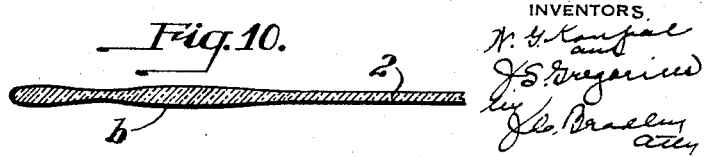

1,631,138

UNITED STATES PATENT OFFICE.

WALTER G. KOUPAL AND JOSEPH S. GREGORIUS, OF MOUNT VERNON, OHIO, ASSIGNORS TO PITTSBURGH PLATE GLASS COMPANY, A CORPORATION OF PENNSYLVANIA.

GLASS-DRAWING APPARATUS.

Application filed October 14, 1926. Serial No. 141,563.

The invention relates to an apparatus for making sheet glass applicable where a continuous sheet is drawn from an open pool or bath, and involves an improvement on edge holding means of the type disclosed in the Koupal Patent No. 1,580,140 of April 13, 1926 and the Gregorius Patent No. 1,596,654 of August 17, 1926. We have found in the application of these edge bowls to enclosed kilns that where artificial cooling is applied to the bowls, either by air or water, an enlargement appears on the gather under that portion of the bowl adjacent the slot therein. This enlargement causes a thickening of the sheet just inside the edge, as indicated at $a$ in Fig. 9. This type of edge is relatively hard and tends to cause breakage, due to the edges cracking off; and also to checks or fine cracks starting at the edges and running inward. The object of the present invention is to overcome this difficulty and reduce the thick portion $a$ of Fig. 9, so that it entirely disappears or approaches more nearly to the proportions indicated at $b$ in Fig. 10. This edge is softer than the one of Fig. 9 and the tendency toward breaking and checking or cracking is largely, if not entirely, eliminated. Two forms of construction for accomplishing this result are shown in the accompanying drawings, wherein:

Figure 1 is a vertical section through the apparatus. Fig. 2 is a vertical section taken at right angles to the section of Fig. 1. Figs. 3, 4 and 5 are detail views of one form of edge bowl, Fig. 3 being a plan view and Figs. 4 and 5 side elevations. Figs. 6, 7 and 8 are detail views of a modified form of edge bowl, Fig. 6 being a plan view and Figs. 7 and 8 side elevations. And Figs. 9 and 10 are enlarged horizontal sections taken at the edges of two sheets of glass, Fig. 9 illustrating the form of edge produced by the use of the old form of edge bowl and Fig. 10 illustrating the form of edge produced by the use of the edge bowl to which the present application is particularly directed.

Referring to the drawings, 1 is a forehearth or drawing tank conected with a melting tank preferably of the regenerator type from which the glass sheet or ribbon 2 is to be drawn continuously. The surface of the bath in the forehearth is partially covered over by means of the plates 3 and 4 and the L-blocks 5 and 6. Mounted above the opening between the L-blocks, is the leer 7 which carries the means for drawing the glass continuously upward from the bath. The means employed for drawing the glass comprises a series of pairs of rollers 8, 9, 10, etc., driven by suitable means, and either made up of asbestos discs or of central supporting members having an asbestos covering. The rolls lying on one side of the sheet are preferably fixed against lateral movement, while the rollers on the other side are yieldingly pressed against the sheet by means of counterweighted levers, as is well known in the art. Any other suitable drawing means might be employed.

The leer is divided into a series of compartments by means of the inclined baffle plates 11, 12, etc. and the temperature of these compartments decreases progressively upward, so that the glass is gradually cooled and annealed as it passes through the leer, being cut into separate sheets as it emerges from the upper end of the leer. At the lower end of the leer is a pair of plates 13 and 14 of the shape indicated in Fig. 1, such plates acting as a partial closure for the compartment 15 at the bottom of the leer, and also serving to catch any broken glass falling from this compartment.

The space into which the glass sheet is drawn beneath the leer is closed in by means of the end plates 16 and 17 and the side plates 18 and 19, and the glass is further shielded by means of the inclined plates 20 supported at their lower ends upon the L-blocks 5 and 6 and rest at their upper ends against the water cooled pipes 21.

The edge holding devices comprise the bowl shaped members 22, slotted as indicated at 23, and located adjacent the surface of the bath. These members are preferably made of cast iron or steel (preferably a nickel chromium steel) and are relatively thick and heavy. In service, they become red hot and act as reflectors maintaining the areas of glass therebeneath considerably hotter than would otherwise be the case. The slots 23 are somewhat wider than the thickness of the glass, and the contact between the glass and the edge of the slot is relatively slight. There is, however, sufficient adherence to prevent the edge of the sheet from working inward during the drawing operation, unless the metal reaches too high a temperature, in which case, the devices will release their hold upon the edges of the sheet and permit it to narrow. This overheating will not ordinarily occur, if the space between the L-blocks and the lower end of the leer is not closed in, but when such space is closed in, as is done by the use of the plates 16, 17, 18 and 19, this overheating and release of the edges of the sheet sometimes occurs. This condition is taken care of either by the use of a pair of water coolers arranged on either side of the slot, as shown in the Gregorius Patent No. 1,596,654 of August 17, 1926, or by the use of a pair of small air supply pipes 26, 26 arranged to straddle the slot, as indicated in Fig. 3, and having their ends recurved (Fig. 2). The branches of the pipe are supplied with air under pressure from the pipe 27 and connected to a supply hose 28. The pipes 26, 26 are of relatively small diameter and the pressure employed is low, so that there is only a gentle flow of air downward along the upper surface of the bowl adjacent the sides of the slot 23. This air supply chills the portion of the bowl which engages the edge of the sheet to such an extent that such edge will not pull away from the edge holding device. The use of this chilling device does, however, have the effect of chilling the sheet inward from its extreme outer edge so that the secondary swell indicated at *a* on Fig. 9 is produced. This secondary swell is somewhat exaggerated on Fig. 9 in order to make the showing clearer, but the thickening is of a substantial character and increases the amount of waste glass which must be cut away from the sheet in the cutting room. This edge is also very hard and tends to cause breakage, both by the edges stripping off and by checks or fine cracks starting from the edge and running inward.

The present invention is designed to overcome this difficulty, and this is accomplished in the form of the device shown in Figs. 3, 4 and 5 by the provision of the pair of inwardly projecting fins 29, 29 preferably made integral with the body of the bowl 22. These fins act as reflectors so that a considerable amount of additional heat from the bath is reflected downwardly upon such bath with the result that the glass from which the edge is generated is at a somewhat higher temperature than would be the case if the fins or flanges were not used. This additional heat as applied to the edge of the sheet reduces the secondary swell shown in Fig. 9, so that such swell is reduced to the proportions indicated at *b* in Fig. 10. A slight swell still remains, but it is practically negligible, and the edge is substantially softer than that produced when the fins or flanges are not used. As a result, any breakage and checking due to hard edges is largely eliminated, and the amount of waste glass is reduced as the sheet may be trimmed closer to the edge than it was possible to do with an edge such as that shown in Fig. 9.

Figs. 6, 7 and 8 show a modification for performing the same function as the flanges or ribs 29, 29 of the construction above described. In this form of bowl, the heat reflecting members are in the form of the lugs 30, 30 cast integral with the bowl 31 and projecting inwardly toward the center of the sheet being drawn. Still other forms of reflecting members might be employed for accomplishing this same function.

The bowls 22 and 30 may be supported in any desired manner, so that they can be adjusted to meet requirements. As illustrated, they are supported upon bars 32 passing through forked supports 33 seated upon the side walls of the furnace, the rear end of the bars passing through adjustable rods 34 carried by standards 35. The position of the rod 34 is fixed by means of the set screw 36.

The invention is not limited to the particular shaped bowl shown, or to the use of artificial cooling means in connection with the bowls. The improvement in the edge of the glass sheet is most marked under the conditions of artificial cooling, but with a standard window glass batch, which seems to require no artificial cooling of the edge bowls, an improvement in edge produced is shown when the bowl having the fins or flanges is substituted for the old form of bowl without the fins.

What we claim is:

1. The combination with apparatus arranged to draw a glass sheet from an open pool of molten glass, of means for preventing inward movement of the edge of the sheet in said pool, comprising a shielding bowl above the glass, but closely adjacent thereto, and having a slot extending inward from its edge and fitting around the edge of the sheet, cooling means for the bowl, and reflecting members projecting outward from the bowl on each side of the slot.

2. The combination with apparatus arranged to draw a glass sheet from an open pool of molten glass, of means for preventing inward movement of the edge of the sheet in said pool, comprising a shielding bowl above the glass, but closely adjacent thereto, and having a slot extending inward from its edge and fitting around the edge of the sheet, cooling means for the bowl, and reflecting members integral with the bowl projecting outward from the bowl on each side of the slot.

3. The combination with apparatus arranged to draw a glass sheet from an open pool of molten glass, of means for preventing inward movement of the edge of the sheet in said pool, comprising a shielding bowl above the glass, but closely adjacent thereto, and having a slot extending inward from its edge and fitting around the edge of the sheet, and heat reflecting portions on the bowl projecting horizontally from the body of the bowl on each side of said slot and adjacent thereto.

4. The combination with apparatus arranged to draw a glass sheet from an open pool of molten glass, of means for preventing inward movement of the edge of the sheet in said pool, comprising a shielding bowl above the glass, but closely adjacent thereto, and having a slot extending inward from its edge and fitting around the edge of the sheet, and heat reflecting flanges projecting horizontally from the body of the bowl on each side of said slot and adjacent thereto.

WALTER G. KOUPAL.
JOSEPH S. GREGORIUS.